US005751342A

United States Patent [19]

Kim et al.

[11] Patent Number: 5,751,342

[45] Date of Patent: May 12, 1998

[54] VISUAL INSPECTION SYSTEM FOR A PRODUCT

[75] Inventors: Man-Tae Kim, Gumgoc-dong; Min-Sik Kim, Kyungki-do; Jin-Hong Park, Unyang-eup, all of Rep. of Korea

[73] Assignee: Samsung Display Devices Co., Ltd., Kyungki-do, Rep. of Korea

[21] Appl. No.: 743,128

[22] Filed: Nov. 1, 1996

[30] Foreign Application Priority Data

Nov. 22, 1995 [KR] Rep. of Korea .................... 95-42937

[51] Int. Cl.$^6$ .................... H04N 7/18

[52] U.S. Cl. .................... 348/92; 348/181; 348/189

[58] Field of Search .................... 348/181, 189, 348/190, 92, 125, 126, 129, 130; 324/770; 345/904

[56] References Cited

U.S. PATENT DOCUMENTS

| | | | |
|---|---|---|---|
| 5,260,780 | 11/1993 | Staudt | 348/92 |
| 5,293,178 | 3/1994 | Kobayashi | 348/92 |
| 5,369,432 | 11/1994 | Kennedy | 348/181 |
| 5,481,619 | 1/1996 | Schwartz et al. | 348/92 |
| 5,537,145 | 7/1996 | Miseli | 348/181 |
| 5,541,645 | 7/1996 | Davis | 348/92 |
| 5,572,444 | 11/1996 | Lentz | 348/181 |

*Primary Examiner*—Tommy P. Chin
*Assistant Examiner*—Luanne P. Din
*Attorney, Agent, or Firm*—Christie, Parker & Hale, LLP

[57] ABSTRACT

A visual inspection system for a product can test various kinds of liquid crystal displays by changing only the data in a video system for automatically testing a liquid crystal display panel, and comprises a data input block operated by a control signal or data inputted by the tester; a signal processor for inputting the data required for a control program and an operation from the data input block, and for testing a product; and an image sensor for inputting a video image, of a photograph of a product to be tested, to the signal processor.

4 Claims, 1 Drawing Sheet

Image Sensor
3
2
30
Third Buffer
31
Hardware Controller
32
Image Memory
35
Data Memory
33
Fourth Buffer
34
Operation Controller
20
10
System Memory
15
Second Buffer
12
Flag Memory
13
Control Register
14
First Buffer
11
Data Block Input
1
Control Signal
Data

VISUAL INSPECTION SYSTEM FOR A PRODUCT

BACKGROUND OF THE INVENTION

A. Field of the Invention

The present invention relates to a visual inspection system for a product. More particularly, the present invention relates to a visual inspection system for a product which can visually inspect various kinds of liquid crystal displays by changing only a data in a system for automatically inspecting a liquid crystal display panel.

B. Description of the Prior Art

Generally, a product is tested for functionality after the product is mass-produced.

To test the mass-produced product, several operations which were previously set are individually performed using an additional testing device. That is, a function of the product is tested, while an operation state or the state of an output signal is being checked.

The external state of the product is visually inspected by comparing the state of the mass-produced product with the state of a reference product when visually testing the state of the mass-produced product.

Accordingly, in a conventional testing method, a defective product is rejected by visually inspecting the mass-produced product through a human eye with an additional optical device.

However, the above-mentioned conventional testing method has disadvantages in that it requires lots of labor and time, and a high occurrence of the defective product being accepted since the test is manually performed.

In addition, the above-mentioned conventional testing method has another disadvantage in that a tester cannot determine whether the product operates normally since the tester checks only the external shape visually.

To overcome the above-mentioned disadvantages, the product to be visually inspected and the reference product are photographed through a test camera and a reference camera, respectively when testing the state of the mass-produced products such as a liquid crystal display panel using the additional testing device.

A control device compares and analyzes video data produced by the photograph of the test camera and the reference camera, and determines the product as defective when the video data produced from the two cameras are different from each other.

As described above, the conventional visual inspection system can inspect only one kind of product such as the mass-produced liquid crystal display.

Accordingly, the above-mentioned conventional visual inspection has the disadvantage when the old control device has to be replaced by a new control device or the old control device has to be redesigned according to a changed test item whenever the product to be tested or the test item changes, since the device for processing the inputted video signal is embodied by hardware such as a transistor logic (TTL), causing the waste of lots of money and time.

SUMMARY OF THE INVENTION

Accordingly, the objective of the present invention is to provide a visual inspection system for a product to inspect various kinds of liquid crystal display panels by changing only the data according to a tester in a visual inspection system for automatically inspecting a liquid crystal display panel to substantially obviate one or more of the problems due to limitations and disadvantages of the prior art.

To achieve the objective and in accordance with the purpose of the invention, the visual inspection system for a product comprises:

a data input block operated by a control signal or the data inputted by a tester;

a signal processor in which the data required for a control program and an operation are inputted by the data input block, for testing a product; and an image sensor for inputting a video image of a photograph of a product to be tested to the signal processor.

Additional objectives and advantages of the invention are set forth in part in the description which follows, and will be apparent from the description, or may be learned by practice of the invention. The objects and advantages of the invention will be attained by means of the elements and combinations particularly pointed out in the appended claims.

BRIEF DESCRIPTION OF THE DRAWINGS

The accompanying drawing, illustrates an embodiment of the invention and, together with the description, serves to explain the principle of the invention.

DESCRIPTION OF THE PREFERRED EMBODIMENT

Figure 1:
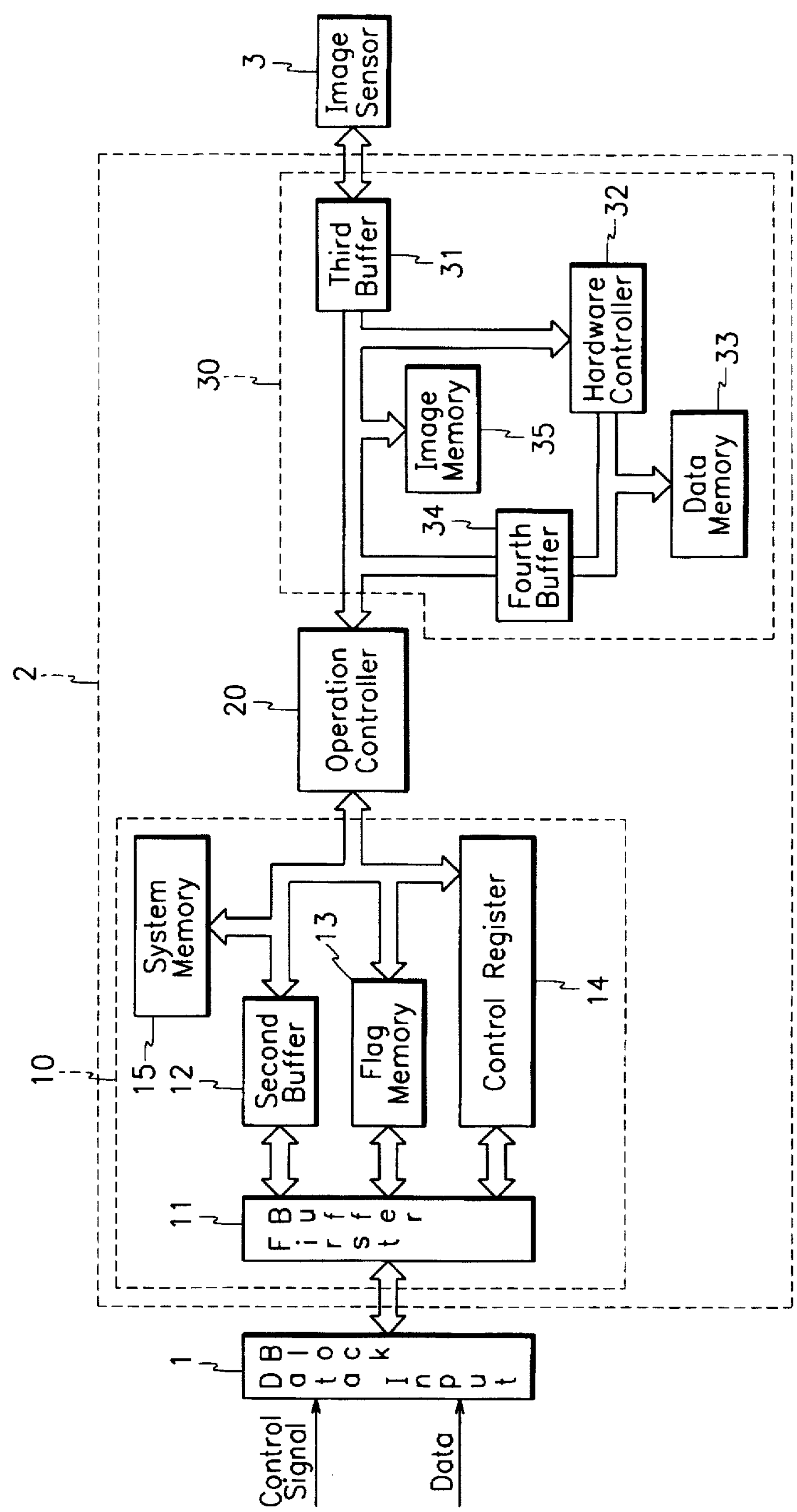
FIG. 1 is a block diagram illustrating a visual inspection system for a product in accordance with a preferred embodiment of the present invention.

Reference will now be made in detail to a preferred embodiment of the present invention, an example of which is illustrated in the accompanying drawing.

Referring to FIG. 1, a visual inspection system for a product in accordance with the preferred embodiment of the present invention includes:

a data input block 1 for inputting a control signal from a tester;

a signal processor 2 for inputting a control program, loaded according to the control signal, and the data from the data input block 1; and an image sensor 3 for inputting a video image of a product to be tested to the signal processor 2.

The signal processor 2 includes a control signal processor 10, an operation controller 20 connected to the control signal processor 10 and to which the control program is loaded, thereby performing a corresponding control operation to the control signal and the data applied from each device, and a video signal controller 30.

The control signal processor 10 includes:

a first buffer 11 for temporarily storing data inputted from the data input block;

a second buffer 12 connected to the first buffer 11 and for receiving/outputting data;

a flag memory 13 connected to the first buffer 11;

a control register 14 connected to the first buffer 11; and a system memory 15 connected to the second buffer 12, the flag memory 13 and the control register 14.

In addition, the video signal controller 30 includes:

a third buffer 31 for temporally storing the video signal inputted from the image sensor 3;

a hardware controller 32 for selecting the necessary data from the video signal through the third buffer 31;

a data memory 33 for storing the data produced by the operation of the hardware controller 32 and receiving/outputting the data;

a fourth buffer 34 mounted between the operation controller 20 and the data memory 33, and for temporally storing the inputted data from the data memory 33; and an image memory 35 mounted between the operation controller 20 and the third buffer 31, and for storing the inputted video data from the image sensor 3.

The operation of the video process system for visually inspecting a product in accordance with the preferred embodiment of the present invention is explained as follows.

First, a tester inputs the control signal for controlling the operation of the data system into the control signal processor 10 in the signal processor 2 through the data input block 1.

The image sensor 3 takes a photograph of the product being transferred for visual inspection. The produced video image data is converted into the data and inputted to the video signal controller 30 in the signal processor 2.

The image sensor 3 which converts a video image of the product into the video data may be embodied by a charge coupled device (CCD) which can process the video data into an electric signal.

As described above, when the signal required for the operation of each system is inputted, each corresponding control signal is performed.

Accordingly, the tester loads a program for processing a digital signal in the operation controller 20 of the signal processor 2 through the data input block 1, and the video signal controller 30 of the signal processor 2 stores the video data, which is converted into a digital signal by the image sensor 3, in the image memory 35 via the third buffer 31.

At the same time, the necessary data is selected by the operation of the operation controller 20 and stored in the data memory 33. The data necessary for the operation of the hardware controller 32 is read from the data memory 33 or stored in the data memory 33.

Accordingly, the operation controller 20 in the signal processor 2 carries out the testing using the control signal inputted into the data input block 1 and through the first buffer 11 in the control signal processor 10, specific information stored in the data memory 33 by the image sensor 3, and the video data inputted from the image memory 35.

The testing operation by the operation controller 20 analyzes the video data inputted from the image sensor 3 in response to a control command stored in the control register 14 and the processed video data stored in the data memory 33.

Accordingly, the operation controller 20 determines whether the product is defective according to the state of the video data corresponding to the product using the inputted video data and the processed video data.

The operation controller 20 stores the result of the control operation in the flag memory 13 when the video data is processed in response to the control signal through the above-mentioned operation principle.

Accordingly, the state information of the flag memory 13 is outputted to the data input block 1 through the first buffer 11, the tester determines the test results corresponding to the state of the flag memory 13 using an information output device (not shown) of which output state changes according to the state of the data outputted through the data input block 1.

Basic data or information required for the operation of the system is stored in the system memory 15, making the basic input/output operation of the system possible.

As described above, data or a program required for the testing operation is already stored in the operation controller 20 or other memory when the tester tests whether the product is defective, by processing the video data inputted through the image sensor 3.

Accordingly, it is acceptable that only the corresponding data or the control program is changed even when a testing object or a testing item changes since the necessary operation can be carried out using only the program of the operation to be controlled and the necessary data according to the program of the operation to be controlled. That is, the system can be embodied only by replacing the corresponding old control device with a new one or changing the content stored by an external input device.

Accordingly, the effect of the present invention lies in that there is no need to design the control device again whenever the control operation or the control item changes, thereby preventing an increase in cost and time.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A visual inspection system for a product comprising:

a data input block operated by a control signal or data inputted by the tester;

a signal processor for inputting the data required for a control program and an operation from the data input block, and for testing a product; and an image sensor for inputting a video image, of a photograph of a product to be tested, to the signal processor;

wherein the signal processor includes:

a control signal processor for receiving a control signal or data inputted through the data input block, reading the data from an operation result, and outputting the read data, an operation controller for storing the control program and the data inputted by the control signal processor, and for controlling the testing operation for the product according to the operation of the stored control program, and a video signal controller for receiving the video data of the product required for the control operation of the operation controller through the image sensor, processing the image data into a signal, and storing the signal in a memory, wherein the control signal processor includes a first buffer for temporarily storing data inputted from the data input block, a second buffer connected to the first buffer and for receiving/outputting data, a flag memory connected to the first buffer for storing the data value changed according to a test result, a control register, connected to the first buffer, for storing a control command required for the operation, and a system memory, connected to the second buffer, the flag memory and the control register, for storing the data required for a basic input/output operation of a system.

2. A visual inspection system for a product, comprising:

a data input block operated by a control signal or data inputted by the tester;

a signal processor for inputting the data required for a control program and an operation from the data input block, and for testing a product; and an image sensor for inputting a video image, of a photograph of a product to be tested, to the signal processor;

wherein the signal processor includes:

a control signal processor for receiving a control signal or data inputted through the data input block, reading the data from an operation result, and outputting the read data, an operation controller for storing the control program and the data inputted by the control signal processor, and for controlling the testing operation for the product according to the operation of the stored control program, and a video signal controller for receiving the video data of the product required for the control operation of the operation controller through the image sensor, processing the image data into a signal, and storing the signal in a memory, the video signal controller having a buffer for temporally storing the video signal inputted from the image sensor, a hardware controller for selecting the necessary data from the video signal through the buffer, a data memory for storing the data produced by the operation of the hardware controller and receiving/outputting the data signal, another buffer, mounted between the operation controller and the data memory, for temporally storing the inputted data, and an image memory, mounted between the operation controller and the buffer, for storing the inputted video data.

3. A visual inspection system for a product, comprising:

a data input block for inputting a control signal and data;

an image sensor for inputting a video image of a product to be tested; and a signal processor for testing the product, said signal processor comprising:

a control signal processor having a first buffer for temporarily storing the control signal and the data inputted through the data input block, a control register connected to the first buffer for storing the control signal, and a second buffer for outputting the data from the first buffer, a video signal controller for receiving the video image of the product from the image sensor, processing the video image data into an image signal, and storing the image signal in memory, and an operation controller for storing the data from the second buffer, and for generating a test result in response to the control signal according to the stored data and the image signal, wherein the control signal processor further comprises a flag memory connected to the first buffer for storing the test result, and a system memory connected to the second buffer, the flag memory and the control register for controlling input and output operations of the control signal processor.

4. The visual inspection system of claim 3 wherein the video signal controller comprises a third buffer for temporally storing the image signal, an image memory connected to the third buffer for storing the image signal, a hardware controller for selecting at least a portion of the image signal from the third buffer, a data memory for storing said at least a portion of the image signal, and a fourth buffer connected to the data memory for temporally storing said at least a portion of the image signal, and wherein the operation controller generates said test result in response to the control signal according to the stored data and the image signal from at least one of the third and fourth buffers.

* * * * *

UNITED STATES PATENT AND TRADEMARK OFFICE

CERTIFICATE OF CORRECTION

PATENT NO. : 5,751,342

DATED : May 12, 1998

INVENTOR(S) : Man-Tae Kim; Min-Sik Kim; Jin-Hong Park

It is certified that error appears in the above-indentified patent and that said Letters Patent is hereby corrected as shown below:

Column 2, line 64, change "temporally" to -- temporarily --.
Column 3, line 5, change "temporally" to -- temporarily --.
Column 5, line 18, change "temporally" to -- temporarily --.
Column 5, lines 25,26, change "temporally" to -- temporarily --.
Column 6, line 21, change "temporally" to -- temporarily --.
Column 6, lines 29,30, change "temporally" to -- temporarily --.

Signed and Sealed this

Eleventh Day of May, 1999

Attest:

Q. TODD DICKINSON

*Attesting Officer*

*Acting Commissioner of Patents and Trademarks*